United States Patent

[11] 3,563,354

[72] Inventor Hans Sigg
 Widen, Aargau, Switzerland
[21] Appl. No. 800,415
[22] Filed Feb. 19, 1969
[45] Patented Feb. 16, 1971
[73] Assignee Maag Gear Wheel & Machine Company Limited
 Zurich, Switzerland
 a company of Switzerland
[32] Priority Nov. 25, 1968
[33] Switzerland
[31] 17,507

[54] AUTOMATICALLY ENGAGING AND DISENGAGING DOG CLUTCH
 3 Claims, 8 Drawing Figs.
[52] U.S. Cl. .................................................. 192/35,
 192/46, 192/67
[51] Int. Cl. .................................................. F16d 23/02,
 F16d 41/22
[50] Field of Search .......................................... 192/35, 45,
 67(A), 48.6, 48.92

[56] References Cited
 UNITED STATES PATENTS
 2,551,000 5/1951 Horton ..................... 192/67(A)(UX)
 2,913,084 11/1959 Short ............................ 192/67(A)
 3,458,021 7/1969 Clements et al. ............. 192/67(A)

Primary Examiner—Allan D. Herrmann
Attorneys—Howard J. Churchill, Robert S. Dunham, P. E. Henninger, Lester W. Clark, Thomas F. Moran, Gerald W. Griffin, R. Bradlee Boal, Christopher C. Dunham, Robert Scobey and Abraham Engel ABSTRACT: In an automatically engaging and disengaging dog clutch between an input shaft and an output shaft, comprising a first straight-toothed clutch boss, a second helical-tooth clutch boss, an axially slidable clutch spider and a synchronizing sleeve which is retained against axial movement in the clutch spider but is rotatable therein and is connected by screw-threading means of coarse pitch to the second clutch boss, said clutch spider being in constant mesh by way of straight-tooth gearing with the first clutch boss and being adapted for optional engagement with and disengagement from the second clutch boss, automatic clutch engagement being obtained by virtue of the relative engagement phase between the clutch spider and the second clutch boss being sensed by pawls which are adapted to mesh with a ratchet tooth system of the synchronizing sleeve, the clutch spider in a first engagement phase being partially engaged with the second clutch boss due to a helical motion which corresponds to the said coarse-pitch screw thread, the clutch spider, in a second engagement phase, is fully engaged with the second clutch boss as far as a stop under the effect of a torque exerted by the input shaft on the output shaft, the pitch of the helical gear tooth system of the second clutch boss being greater than the pitch of the said coarse screw thread, so that the sensing pawls are disengaged during the second engagement phase and therefore do not participate in transmitting power when the clutch is engaged.

Patented Feb. 16, 1971 3,563,354

Patented Feb. 16, 1971

AUTOMATICALLY ENGAGING AND DISENGAGING DOG CLUTCH

The invention relates to an automatically engaging and disengaging dog clutch between an input shaft and an output shaft, comprising a first straight-toothed clutch boss, a second helical-toothed clutch boss, and axially slidable clutch spider and a synchronizing sleeve which is retained against axial movement in the clutch spider but is rotatable therein and is connected by screw-threading means of coarse pitch to the second clutch boss, said clutch spider being in constant mesh by way of straight-tooth gearing with the first clutch boss and being adapted for optional engagement with and disengagement from the second clutch boss, automatic clutch engagement being obtained by virtue of the relative engagement phase between the clutch spider and the second clutch boss being sensed by pawls which are adapted to mesh with a ratchet tooth system of the synchronizing sleeve, the clutch spider in a first engagement phase partially engaged with the second clutch boss due to a helical motion which corresponds to the said coarse-pitch screw thread.

A clutch of the kind heretofore described has been disclosed in which an overrunning clutch with pawls and ratchet wheel is used for synchronization. To prevent these sensitive parts participating in the transmission of power, said pawls are displaced and disengaged axially and relative to the ratchet wheel when the clutch is engaged. This means that the pawls must be secured by pins. The engageable and disengageable clutch in this known clutch system is provided with straight-tooth gearing. To permit engagement without danger of clutch teeth striking each other it is necessary to have a tooth clearance which is exceptionally large for dog clutches.

A further similar clutch has also been disclosed which does not have these disadvantages but requires in the second phase of the engagement procedure an additional, for example, hydraulic force in order to completely engage the clutch. Clutches of this kind are employed where it is possible for substantial negative torques to occur because said clutch does not disengage when the torque is reversed.

The automatically engaging and disengaging dog clutch according to the invention overcomes these disadvantages in that in a second engagement phase the clutch spider is fully engaged with the second clutch boss as far as a stop under the effect of a torque exerted by the input shaft on the output shaft, the pitch of the helical gear tooth system of the second clutch boss being greater than the pitch of the said coarse screw thread, so that the sensing pawls are disengaged during the second engagement phase and therefore do not participate in transmitting power when the clutch is engaged.

The automatically engaging and disengaging dog clutch according to the invention engages completely under the effect of a small torque and without any supplementary external forces. If the torque is reversed, the clutch disengages instantly.

The disadvantages of the first-mentioned clutch are not present in the clutch according to the invention. The pawls are not axially displaced relative to the rachet wheel. However, the pawls are guided so that they are reliably disengaged when the clutch is completely engaged and cannot participate in transmitting the torque. Accordingly, it is possible to embed the pawls loosely in chambers without the use of retaining pins. Such pawls are extremely rugged and operate practically without friction. This fact enables such clutches to be employed for very high rotational speeds. The tooth clearance can be reduced to very small amounts, as is common practice for dog clutches intended for very high rotational speeds. This is achieved by the engagement in two phases at two different pitches of the helical-tooth systems and of the coarse screw thread.

One form of clutch according to the present invention is shown diagrammatically in the accompanying drawings, in which.

Figure 1:
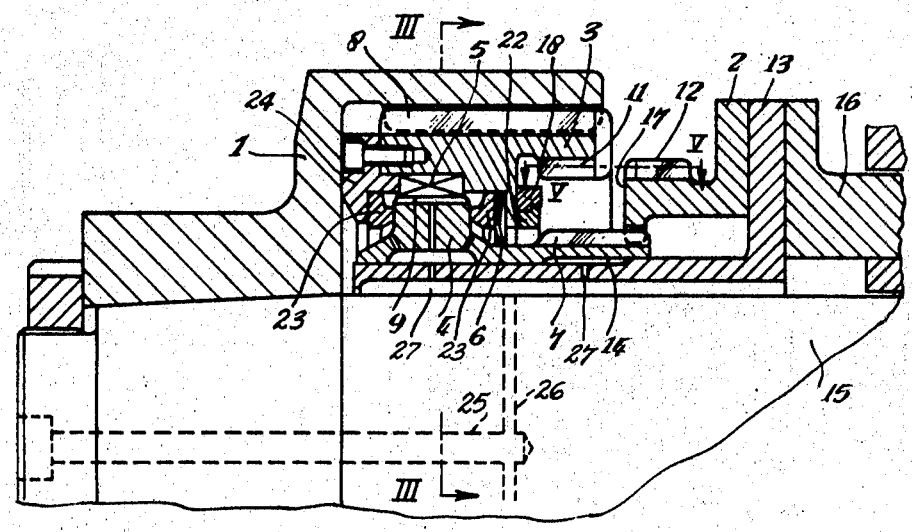
FIG. 1 is a longitudinal section of the upper half of the clutch with the parts shown in the disengaged position.

A first, straight-toothed clutch boss 1 is fixedly connected to a prime mover, for example to a gas turbine shaft 15 which forms an input shaft. A clutch spider 3 having straight-tooth gearing 8 and helical gearing 11, is adapted to slide axially in the first clutch boss 1, the straight-tooth gearing 8 being constantly in mesh with similar gearing in the clutch boss 1. A second clutch boss 2 and a hollow shaft 13 are fixedly connected to an output shaft 16. The clutch boss 2 is provided with a helical-tooth system 12 which may be brought into engagement with the helical-tooth system 11 of the clutch spider 3, and is connected to a synchronizing sleeve 4 by a coarse-pitch screw thread 7.

The teeth of the two tooth systems 11 and 12 are chamfered at their confronting faces. The synchronizing sleeve 4, constantly connected by way of the coarse-pitch thread 7 to the second clutch boss 2, is supported on the hollow shaft 13 so that it can execute a positive helical motion relative to the said hollow shaft, the said helical motion taking place along the coarse-pitch screw thread 7. The clutch spider 3 is axially immovable relative to the synchronizing sleeve 4 and, in the disengaged condition, is supported in the straight-tooth system 8. The clutch spider 3 is provided with one or more chambers 10, formed by gaps in a ring 24 secured to the clutch spider distributed circumferentially thereof and having pawls 5 loosely disposed therein. Centrifugal action causes an external tipping surface 21 of the pawls 5 to bear upon the outer wall of the chambers 10. The tipping surface 21 is so selected that the centrifugal force produces a tipping moment which lightly thrusts the pawl nose on to a ratchet tooth system 9 in the synchronizing sleeve 4. For as long as the synchronizing sleeve 4 rotates at a higher speed than the first clutch boss 1, the ratchet tooth system 9 will slide freely under the pawls 5. However, if the relative speed is reversed, that is to say, as soon as the first clutch boss 1 rotates at a higher speed than the synchronizing sleeve 4, one of the pawls 5 will immediately engage in the ratchet tooth system 9 and provide a power flow between the first clutch boss 1 and the synchronizing sleeve 4.

Figure 7:
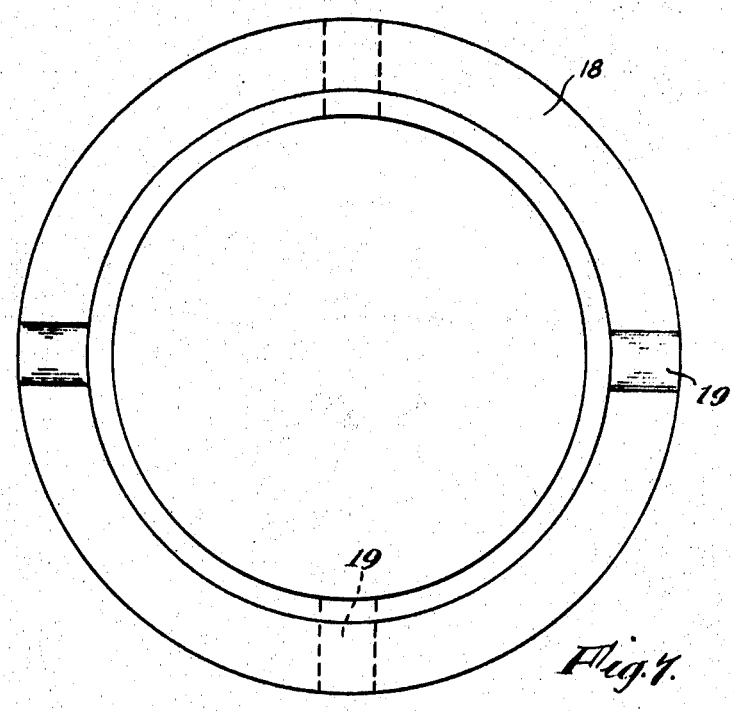
FIG. 7 is an elevation of a universally jointed stop ring.
Figure 8:
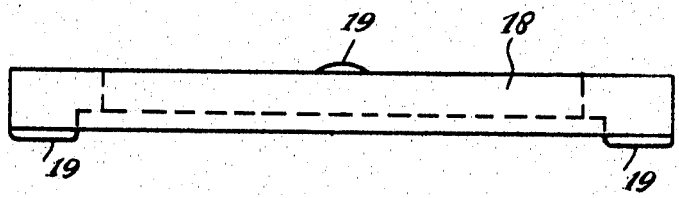
FIG. 8 is a plan view of FIG. 7.

When engaged, the clutch spider 3 can directly abut a stop 17 which is provided by a universally jointed ring 18 which enables the clutch spider 3 to execute a rocking motion in the tooth system in the same way as a dog clutch sleeve of conventional construction. The universally jointed ring 18, illustrated in FIGS. 7 and 8, is provided on each end face with two oppositely disposed protuberances 19, the protuberances on one end face being displaced by 90° relative to the protuberances on the other end face and is held in position, with a slight axial clearance by a ring 22.

To describe the method of operation of the dog clutch it is assumed that initially the driving or input shaft 15 with the first clutch boss 1 is stationery and the clutch spider 3 is disengaged from the clutch boss 2, that is to say, the tooth systems 11 and 12 are disengaged (FIG. 1). The clutch spider 3, with the pawls 5, also does not rotate. The output shaft 16 rotates together with the second clutch boss 2, the hollow shaft 13 and the synchronizing sleeve 4 which rotates freely under the pawls 5. Oil for lubrication and to feed an annular chamber 14 is injected into a center bore 25 of the shaft 15. Through radial passages 26 the oil flows into the hollow shaft 13 which distributes the oil to the annular chamber 14 and to the synchronizing sleeve 4 through ports 27. Due to rotation of the output shaft 16, the oil in the annular chamber 14 builds up a pressure, resulting in an axial force which acts upon the synchronizing sleeve 4. This axial force retains the clutch spider 3 in the disengaged position by way of synchronizing sleeve 4.

If the input shaft 15 is to be coupled to the output shaft 16, which is already in rotation, the speed of the prime mover is increased. Synchronization and engagement then take place in the following manner. The first clutch boss 1 and the clutch spider 3 with the pawls 5 will rotate together with the input shaft 15. As soon as the input shaft 15 begins to rotate at a higher speed than the output shaft 16, the relative speed between the ratchet tooth system 9 and the pawls 5 is reversed. One of the pawls 5 will engage with a random tooth of the ratchet tooth system 9, produce power flow between the first clutch boss 1 and the synchronizing sleeve 4, and thus initiate the first phase of the engagement operation, that is to say, a helical motion of the synchronizing sleeve 4 relative to the hollow shaft 13 in the axial direction towards the clutch sleeve 2. The same helical motion is also positively executed by the clutch spider 3 relative to the clutch sleeve 2. The axial component of the said helical motion is transmitted by the synchronizing sleeve 4 either directly, or by way of a resilient member 6, to the clutch spider 3. The tooth systems 11 and 12 screw into each other at the pitch of the coarse-pitch thread 7.

Figure 6:
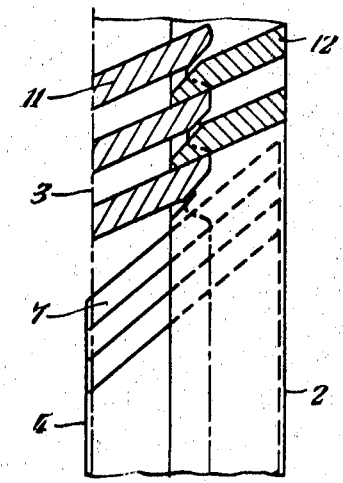
FIG. 6 is a section, along the line VI–VI in FIG. 2, through the helical-tooth system at the beginning of the second engagement phase.

The number of teeth of the helical-tooth system 11 and the number of pawls 5 are matched to each other so that when the tooth systems 11 and 12 engage a tooth in one system automatically meets a gap between teeth in the other system. The aforementioned screw or helical engagement of these tooth systems 11 and 12 takes place without physical contact. The final position of the first phase of the engagement operation is illustrated in FIG. 6; the tooth systems 11 and 12 touch at that moment and produce power flow between the clutch spider 3 and the second clutch boss 2.

The power flow from the prime mover and input shaft 15 to the output shaft 16 then passes from the first clutch boss 1 by way of the clutch spider 3 directly by way of the helical-tooth systems 11 and 12 to the second clutch boss 2 thus initiating a second phase of the engagement operation, that is to say, a helical motion of the clutch spider 3 relative to the second clutch boss 2 in the same axial direction as in the first phase but at the pitch of the helical-tooth systems 11 and 12. The synchronizing sleeve 4 which is positively guided in the axial direction executes the same helical motion as in the first phase, that is to say at the pitch of the coarse-pitch screw thread 7. The pitch of the coarse thread 7 is smaller than the pitch of the helical-tooth systems 11 and 12, and therefore the synchronizing sleeve 4 will execute a circumferential motion relative to the clutch spider 3. This motion causes lifting of one of the rings 23 and the pawl 5 in engagement with the ratchet tooth system 9, thus off-loading same.

Figure 2:
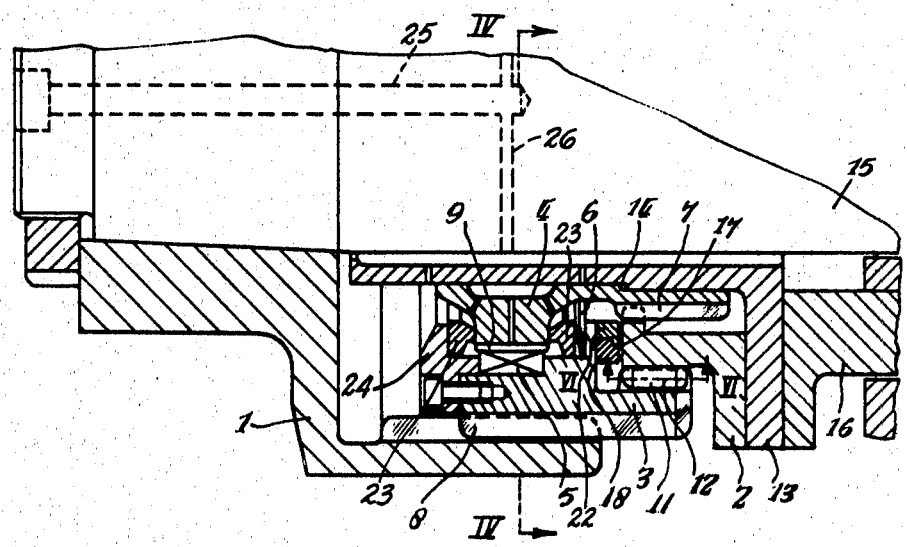
FIG. 2 is a longitudinal section of the lower half of the clutch, with the parts shown in the engaged position.
Figure 3:
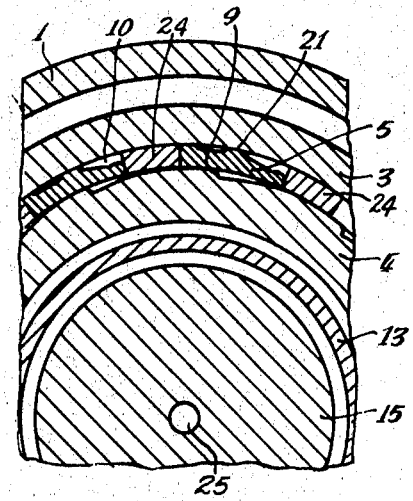
FIG. 3 is a transverse section, along the line III–III in FIG. 1, through pawls and a synchronizing sleeve when the clutch is disengaged.
Figure 5:
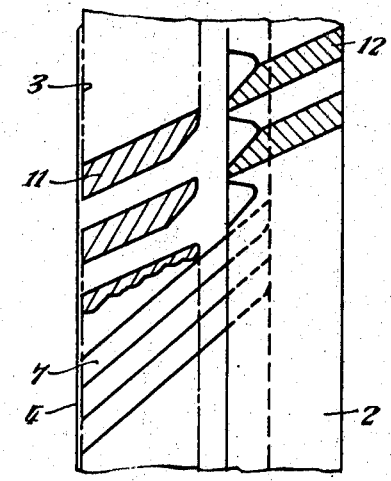
FIG. 5 is a section, along the line V–V in FIG. 1, through the helical-tooth system at the beginning of the first engagement phase.
Figure 4:
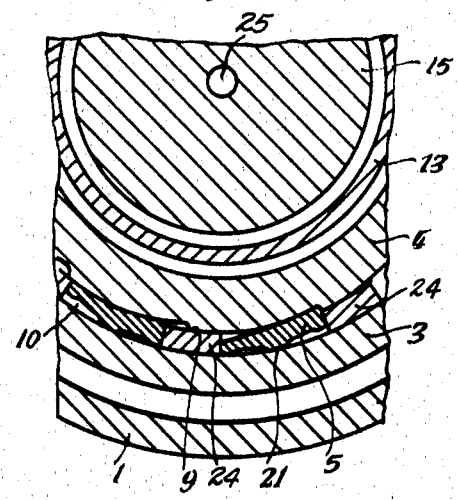
FIG. 4 is a transverse section, along the line IV–IV in FIG. 2, through the pawls and the synchronizing sleeve during the first phase of engagement of the clutch.

In the final position of the second phase (FIG. 2) none of the pawls 5 will be engaged with the ratchet tooth system 9, the input torque from the prime mover and input shaft 15 being transmitted only by way of the straight-tooth system 8 and the helical-tooth systems 11 and 12 to the output shaft 16. The axial component produced by the circumferential force in the helical-tooth systems 11 and 12 retains the clutch spider 3 in the engaged position against the stop 17.

Disengagement of the clutch takes place automatically as soon as the torque is reversed, that is to say, when power flows from the output shaft 16 to the input shaft 15, both phases being traversed in the reverse direction. The disengagement motion is assisted by the oil pressure prevailing in the annular chamber 14.

I claim:

1. Automatically engaging and disengaging dog clutch between an input shaft and an output shaft, said clutch comprising a first straight-toothed clutch boss, a second helical-tooth clutch boss, an axially slidable clutch spider, a synchronizing sleeve within said clutch spider and rotatable and axially immovable therein, screw-threading means of coarse pitch connecting the synchronizing sleeve to the second clutch boss, straight toothing on the clutch spider engaging the straight toothing on the first clutch boss to retain the clutch spider and the first clutch boss in constant mesh, the clutch spider being adapted for optional engagement with an disengagement from the second clutch boss, a ratchet tooth system on the synchronizing sleeve and cooperating sensing pawls in the clutch spider adapted to sense relative engagement between the clutch spider and the second clutch boss, characterized in that said sensing of said relative engagement produces automatic clutch engatement in two phases, namely a first engagement phase in which said coarse-pitch screw-threaded means causes axial movement of the synchronizing sleeve and clutch spider towards the second clutch boss and produces partial engagement of the clutch spider with the second clutch boss, further characterized in that the pitch of the helical gear tooth system of the second clutch boss is greater than the pitch of the said coarse screw-threaded means and a stop means is disposed between the clutch spider and the second clutch boss, whereby, under the effect of a torque exerted by the input shaft on the output shaft the clutch spider is fully engaged with the second clutch boss up to the said stop means in the second engagement phase during which the sensing pawls are disengaged and do not participate in transmitting power when the clutch is fully engaged.

2. Dog clutch according to claim 1 characterized in that the synchronizing sleeve is axially retained in the clutch spider by way of a resilient member to reduce the pawl loading.

3. Dog clutch according to claim 1, characterized in that the stop of the clutch spider is provided by a universally jointed ring.

UNITED STATES PATENT OFFICE
CERTIFICATE OF CORRECTION

Patent No. __3,563,354__  Dated __February 16, 1971__

Inventor(s) __Hans Sigg__

It is certified that error appears in the above-identified patent and that said Letters Patent are hereby corrected as shown below:

Column 1, line 7, "and" should read --- an ---; line 19, after "phase" insert --- being ---

Column 2, line 31, after "confronting" insert --- end ---  line 40, after "spider" insert a comma Column 3, line 26, after "of" insert --- one of the rings and ---; line 54, erase "one of the rings 23 ar Claim 1, line 33 of column 4, "engatement" should read -- engagement ---

Signed and sealed this 29th day of June 1971.

(SEAL)
Attest:

EDWARD M. FLETCHER, JR.  WILLIAM E. SCHUYLER,
Attesting Officer  Commissioner of Pater

FORM PO-1050 (10-69)